No. 736,380. Patented August 18, 1903.

UNITED STATES PATENT OFFICE.

RICHARD GLEY, OF BERLIN, GERMANY, ASSIGNOR TO ACTIEN GESELLSCHAFT FÜR ANILIN FABRIKATION, OF BERLIN, GERMANY.

BLUE SULFUR DYE AND PROCESS OF MAKING SAME.

SPECIFICATION forming part of Letters Patent No. 736,380, dated August 18, 1903.

Application filed May 21, 1903. Serial No. 158,105. (No specimens.)

*To all whom it may concern:*

Be it known that I, RICHARD GLEY, of Berlin, in the Kingdom of Prussia, German Empire, have invented new and useful Improvements in the Manufacture of Blue Sulfur Dye and Process of Making Same; and I do hereby declare that the following is a full, clear, and exact description of the invention, which will enable others skilled in the art to which it appertains to make and use the same.

My invention relates to the manufacture of a new blue sulfur coloring-matter, which is obtained by melting para-dioxydiphenylamin

with sulfur at a temperature surpassing 180°. According to a publication of Schneider (compare *Berichte der Deutschen Chemischen Gesellschaft*, XXXII, page 690) by heating together para-dioxydiphenylamin and sulfur at 180° a blackish-brown product is obtained, which dissolves in caustic alkalies to a blue solution dyeing cotton blue tints. When following the directions given by Schneider, a product dissolving in alkalies to a blue solution may indeed be obtained; but this product has only a very feeble affinity for the fiber and is therefore practically valueless as a coloring-matter. I have found that a dyestuff of great intensity and affinity for the fiber is obtained by heating para-dioxydiphenylamin together with sulfur at a more elevated temperature—as, for instance, at above 230° to 240°.

The following example, in which the parts are by weight, will serve to illustrate my invention: One part of para-dioxydiphenylamin and 4.5 parts of sulfur are heated in an iron vessel to 230° to 240°. This temperature is maintained while stirring till the development of sulfureted hydrogen ceases. After cooling the reaction product is powdered and may be used directly in this form for dyeing. It is a bluish-black powder, insoluble in water, and dissolves in caustic alkalies with a blue, in alkali sulfid with a greenish-blue color, and dyes unmordanted cotton directly in a bath containing salt and sulfid indigo-blue shades of remarkable fastness. The dyestuff dissolves in warm concentrated sulfuric acid with a blue color.

Having now described my invention and in what manner the same is to be performed, what I claim is—

1. The process for the manufacture of a blue coloring-matter containing sulfur by heating para-dioxydiphenylamin and sulfur at a temperature exceeding 180°, substantially as described.

2. The blue coloring-matter containing sulfur, obtained as hereinbefore described, which is insoluble in water, soluble in caustic alkali and in warm sulfuric acid with a blue, in alkali sulfid with a greenish-blue color, dyeing unmordanted cotton directly fast indigo-blue shades, substantially as described.

In witness whereof I have hereunto signed my name, this 25th day of April, 1903, in the presence of two subscribing witnesses.

RICHARD GLEY.

Witnesses:
 WOLDEMAR HAUPT,
 HENRY HASPER.